No. 863,256. PATENTED AUG. 13, 1907.
W. BLALACK.
LAWN SWEEPER.
APPLICATION FILED DEC. 4, 1905.

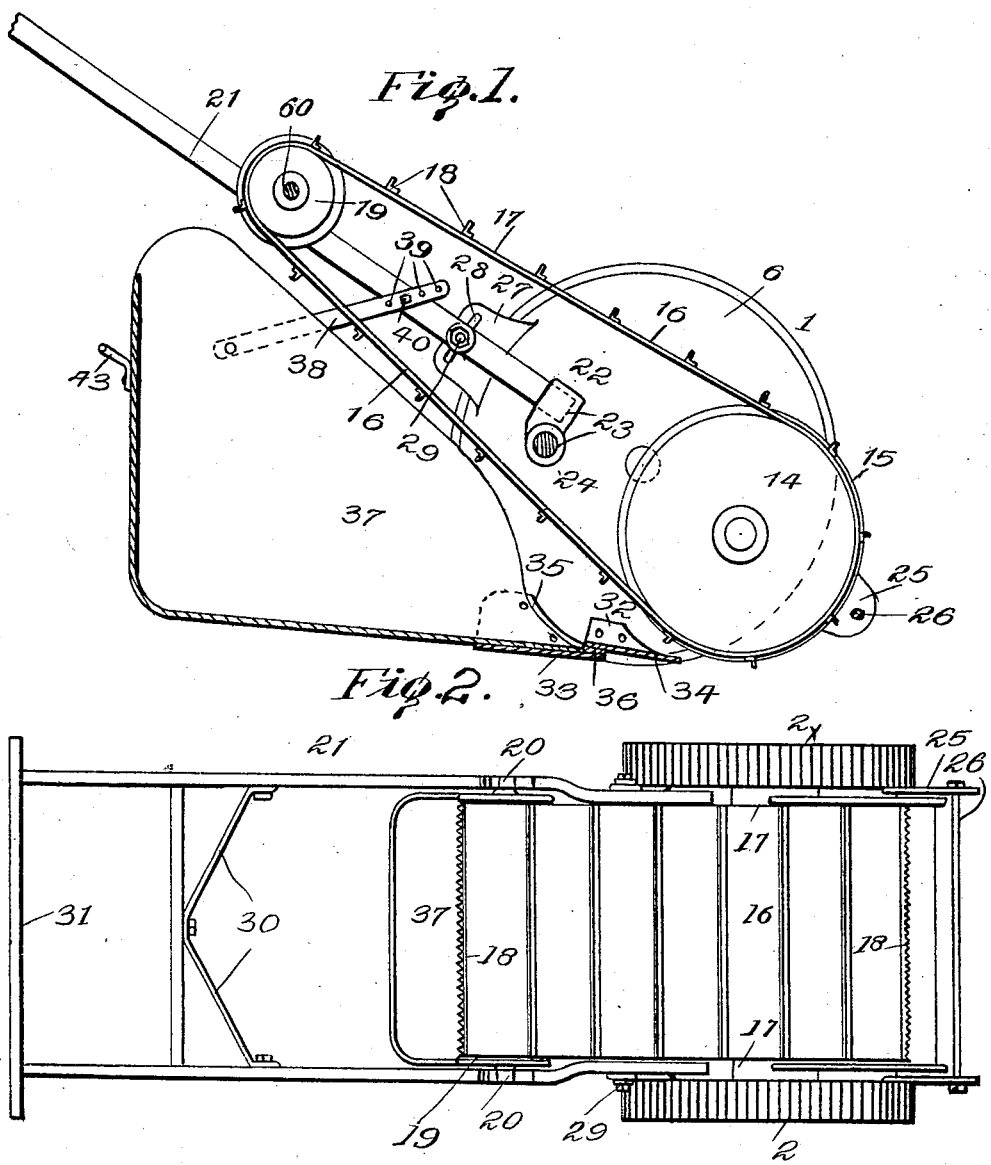

2 SHEETS—SHEET 2.

Witnesses
Inventor
William Blalack
By
Attorneys

UNITED STATES PATENT OFFICE.

WILLIAM BLALACK, OF PARSONS, KANSAS.

LAWN-SWEEPER.

No. 863,256.  Specification of Letters Patent.  Patented Aug. 13, 1907.

Application filed December 4, 1905. Serial No. 290,276.

*To all whom it may concern:*

Be it known that I, WILLIAM BLALACK, a citizen of the United States, residing at Parsons, in the county of Labetta and State of Kansas, have invented certain new and useful Improvements in Lawn-Sweepers, of which the following is a specification.

This invention has for its object an improved lawn sweeper or rake which is composed of comparatively few and simple parts that will be durable as well as efficient in operation and which may be readily constructed and assembled and which will withstand any hard usage to which lawn sweepers are usually subjected.

Figure 3:
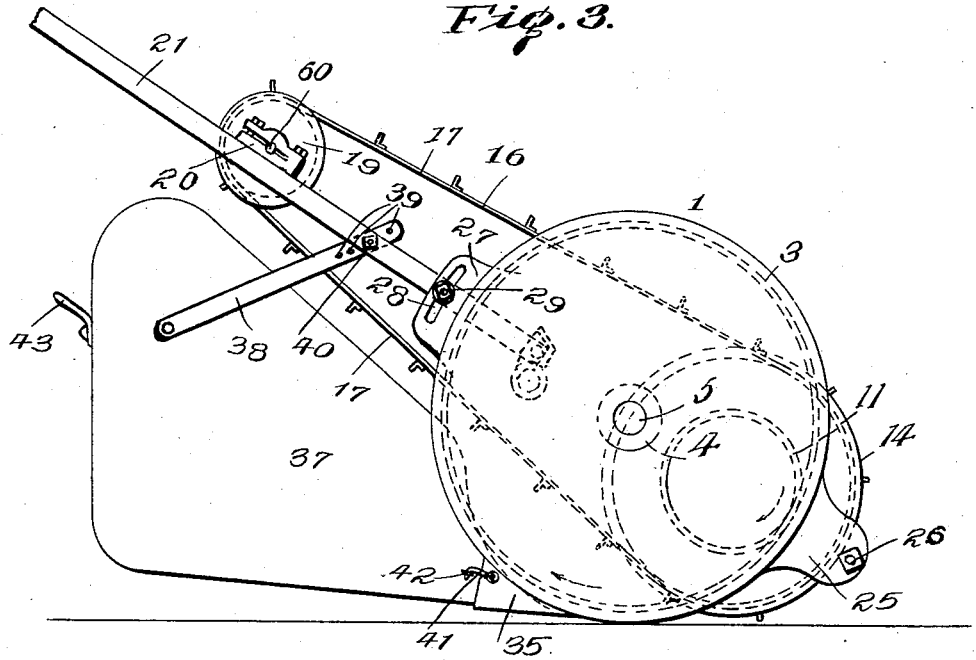
Figure 4:
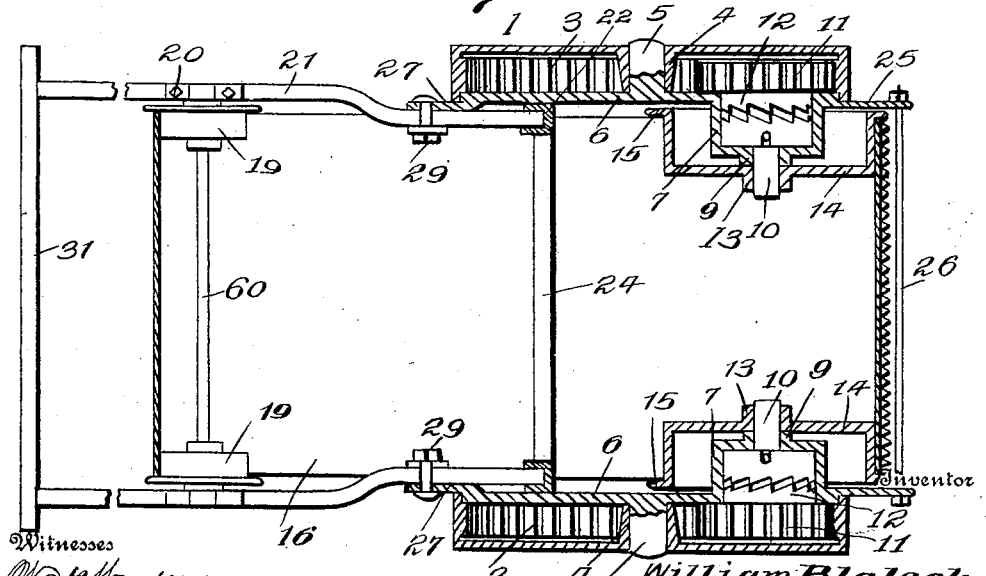

For a full understanding of the invention and the merits thereof and also to acquire a knowledge of the details of construction of the means for effecting the result, reference is to be had to the following description and accompanying drawings, in which:

Figure 1 is a longitudinal sectional view of my improved lawn sweeper; Fig. 2 is a top plan view of the same; Fig. 3 is a side elevation of the sweeper; and, Fig. 4 is a horizontal sectional view thereof.

Corresponding and like parts are referred to in the following description and indicated in all the views of the drawings by the same reference characters.

The framework of the machine comprises essentially the two end plates 6 which in the present instance are shown as approximately circular in shape and are provided at the lower portion of their forward ends with the corresponding projections 25 and at the upper portion of their rear ends with the extensions 27. These two end plates or heads 6 are connected together by means of the transverse rod 24 and the tie rod 26, which latter passes through openings in the forward projections 25. The lower portions of the two end plates 6 are also connected by the transverse plate 34 which has its ends bent upwardly to form the flanges 32 which are riveted or otherwise suitably connected to the said end plates. In order to provide a rigid structure, the rear edge of the transverse plate 34 is preferably bent back upon itself at 36. Inwardly projecting pockets or seats 7 are formed in each of the end plates 6 and are located eccentrically with relation thereto. The supporting wheels 1 upon which the framework is mounted are of the usual tractor type, being provided with toothed or roughened outer faces or peripheries 2 and also with interiorly toothed or geared rims 3. Each of the wheels 1 is formed with a concentric thimble hub 4 which projects inwardly and is journaled upon trunnions 5 projecting outwardly from the end plates 6. A sleeve 9 is formed in connection with each of the pockets 7 and said sleeves serve as the bearings within which stub shafts 10 are journaled. A pinion 11 is loosely mounted upon the outer end of each of the stub shafts, while a pulley wheel 14 is keyed upon the opposite or inner end. These pinions 11 are adapted to mesh with the toothed rim 3 of the corresponding supporting wheel 1, and a clutch mechanism 12 is located within the pocket 7 so that when the machine is moved forwardly, the motion of the supporting wheel is transmitted to the stub shaft 10 and thence to the pulley wheel 14. When the machine is moved backward, however, the action of the clutch 12 operates to prevent the pinion 11 from operating the stub shaft 10.

The pulley wheels 14 have a hollow construction and are formed with the hub portion 13 which fits around the stub shaft 10 and they are also formed with outwardly projecting flanges 15 which serve as guide members for the endless belt 16 and the extremities of the handles 21 are connected by the cross bar 31 which is adapted to be grasped by the operator. In securing the handles to the frame, a pair of castings 22 are employed, the said castings being provided with openings through which the transverse rod 24 passes, and also with the sockets 23 within which the ends of the handles 21 are held. The sockets 23 are angular, as shown. Each of the handle pieces 21 also lies against the corresponding extension 27 upon the end plate 6, and is adjustably connected thereto so that the angle formed by the handle can be regulated. For this purpose a slot 28 is formed in each of the extensions 27 and a locking bolt 29 passes through each of the slots and the corresponding handle piece 21. With this construction, it will be apparent that when the locking bolts 29 are loosened, the handle can be tilted within the limits provided by the slot and can be held rigidly in the desired position by tightening the locking bolt. In the present instance, the handles 21 are also shown as being suitably braced at an intermediate point by means of the transverse members 30.

The endless belt 16 passes around the pulley wheels 14 which are located at corresponding points upon the two end plates 6, and also around the drum 19 mounted upon the shaft 60 which is adjustably journaled in the bearings 20 secured to the handle pieces 21. Owing to the slight longitudinal movement which these adjustable bearings provide for the drum 19, the latter can be moved so as to tighten or loosen the belt 16 as may be required. In the present instance, the endless belt 16 comprises a pair of spaced bands 17 passing around the corresponding pulley wheels 14 and the drum 19, and connected by a series of toothed rake members 18.

The scoop 37 within which the litter is collected has a tilting action and is suspended from the handle pieces 21 by means of the hangers 38 which, preferably, are inclined, as shown so that the weight of the scoop tends to throw the same forward. An adjustable connection is shown as formed between the hangers 38 and the handle pieces 21 by means of which the effective length of the hangers can be varied. This is accomplished by forming a series of apertures 39 in each of the hangers 38, any one of which is designed to accomodate the locking pin 40 according to the manner in which it is desired to suspend the scoop. The forward end of the scoop 37 rests upon seats secured to the end plates 6 immediately in the rear of the transverse plate 34, the said seats being formed by plates 35 which are riveted or otherwise secured to the end plates 6 and which are provided with the outwardly projecting flanges 33 upon which the scoop rests. This construction permits the forward end of the scoop to abut against the transverse plate 34 so that the latter acts somewhat in the manner of a scraper and protects the end of the scoop from injury.

When the machine is pushed forwardly over the lawn, the motion of the supporting wheels 1 will be transmitted to the endless belt 16 through the medium of the pinions 11 and stub shafts 10 and the portions of the endless belt immediately over the lawn will be caused to move rearwardly so that the litter collecting projections upon the rakes 18 will sweep any leaves or other accumulations back into the scoop 37. Should it be desired to dump the scoop 37, this can be readily accomplished by first lowering the handles 21 until the transverse plate 34 comes into contact with the ground and the forward end of the scoop 37 is displaced from the inwardly projecting flanges 33. The handles 21 are then raised so that the scoop 37 is given a tilting motion and dumped. The rear portion of the scoop is formed with a handle piece 43 by means of which the scoop can be readily replaced in normal position when desired. In order to hold the forward end of the scoop securely in position upon the seats formed by the flanges 33 when the machine is in operation, hooks 41 may be provided which are shown as secured to the outer faces of the plates 35 and engaging with eyes 42 upon the sides of the scoop.

Having thus described the invention, what is claimed as new is:

1. In a device of the character described, the combination of a framework, supporting wheels for the framework, pulleys mounted upon the framework, means for transmitting motion from the supporting wheels to the pulleys, handles, drums supported between said handles, an endless belt passing around the pulleys and around said drums, rakes carried by said belt, a scoop for receiving the litter removed by said rakes, and hangers adapted to suspend the scoop in such a manner as to give it a tilting motion for dumping.

2. In a device of the character described, the combination of a framework, supporting wheels for the framework pulleys mounted upon the framework, means for transmitting motion from the supporting wheels to the pulleys, handles extending rearwardly from the framework, drums, supported on said handles, an endless belt passing around the pulleys and said drums, toothed rakes carried by said belt, means for obtaining an angular adjustment of the handles with respect to the framework, and a litter collecting scoop supported from said framework and from said handles, and adapted to have a tilting motion for dumping.

3. In a device of the character described, the combination of a pair of end plates provided with outwardly projecting trunnions, connecting means between said end plates, supporting wheels mounted upon the trunnions and provided with toothed rims, stub shafts journaled in said end plates, pinions mounted upon the stub shafts and meshing with the toothed rims of the supporting rims, pulleys mounted upon the opposite ends of the stub shafts, handles connected to the said framework, drums supported on said handles, an endless belt passing around said pulleys and said drums and provided with toothed raking members, and a scoop supported from said framework and said handles and provided with means whereby it may be adjusted with respect to the handles.

4. In a device of the character described, the combination of a pair of end plates, formed with inwardly projecting pockets and outwardly projecting trunnions, connecting means between the end plates, a supporting wheel mounted upon each trunnion and provided with a toothed rim, stub shafts journaled in the bases of the said pockets, pinions loosely mounted upon the outer ends of the stub shafts and meshing with the toothed rims of the supporting wheels, pulleys mounted upon the opposite ends of the stub shafts, clutch mechanisms located in the pockets and causing the pinions to impart motion to the pulleys when the machine is moved forwardly, handles connected at their inner ends to said end plates, drums journaled in said handles, an endless belt passing around said pulleys and said drums, toothed raking members carried by said belt, and a scoop suspended from said framework and said handles.

5. In a device of the character described, the combination of a framework, supporting wheels for the framework, pulleys mounted upon the framework, means for transmitting motion from the supporting wheels to the pulleys, handles secured to the framework, drums journaled upon the handles, an endless belt passing around the drums and pulleys, toothed raking members carried by said belt, a transverse plate extending across the framework, seats secured to the framework, and a scoop suspending from the machine, the open end of the scoop resting upon the seats and abutting against the said transverse plate.

6. In a device of the character described, the combination of a pair of end plates provided with outwardly projecting trunnions, connecting means between the end plates, supporting wheels mounted upon the trunnions and formed with toothed rims, stub shafts mounted in the end plates, pinions mounted upon the outer ends of the stub shafts and engaging with the toothed rims of the supporting wheels, pulleys mounted upon the opposite ends of the stub shafts, handles secured to the end plates, drums mounted upon the handles, an endless belt passing around the drum and the pulleys, rakes carried by the endless belt, and a scoop suspended from the handles by means of hangers so as to have a tilting motion, the said scoop being adapted to receive the litter collected by the endless belt.

In testimony whereof I affix my signature in presence of two witnesses.

WILLIAM BLALACK. [L. S.]

Witnesses:
T. M. COOPER,
J. F. WOOD.